(12) United States Patent
Hickman et al.

(10) Patent No.: US 6,355,204 B1
(45) Date of Patent: Mar. 12, 2002

(54) METHOD OF MANUFACTURING A DUAL-CHAMBER CONTAINER

(75) Inventors: Randall A. Hickman, Graytown; Daniel G. Weiss, Bowling Green, both of OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/589,139

(22) Filed: Jun. 7, 2000

(51) Int. Cl.[7] ............................................... B29C 49/06
(52) U.S. Cl. ....................................... 264/513; 264/537
(58) Field of Search ................................. 264/513, 516, 264/531, 532, 533, 534, 537

(56) References Cited

U.S. PATENT DOCUMENTS

| | | |
|---|---|---|
| 3,308,214 A | 3/1967 | Schöllauf |
| 3,707,591 A | 12/1972 | Chalfant |
| 4,065,536 A | 12/1977 | Lucas |
| 5,049,224 A | 9/1991 | Umezawa et al. .......... 156/294 |
| 5,135,702 A | 8/1992 | Eales |
| 5,804,227 A | 9/1998 | Deardurff et al. |
| 5,882,574 A | 3/1999 | Geisinger |
| 5,932,166 A | 8/1999 | Bousselin et al. |

OTHER PUBLICATIONS

Belcher, "Injection Blow Molding," *Plastic Blow Molding Handbook*, Ch. 3, pp. 61–82 (1990).

*Primary Examiner*—Suzanne E. McDowell

(57) ABSTRACT

A dual-chamber container is formed in an injection blow molding process. Two preforms are injection molded around respective core rods. The preforms and core rods are then moved to a blow mold, in which the preforms are molded to the confines of the mold. The blow mold has partial walls between the two cavities, which provide directional control over the preforms as the preform wall portions are blown against and contact welded to each other. The outer walls of the preforms, which must travel and stretch a greater amount than the inner walls, are formed thicker in the preform molding operation.

4 Claims, 2 Drawing Sheets

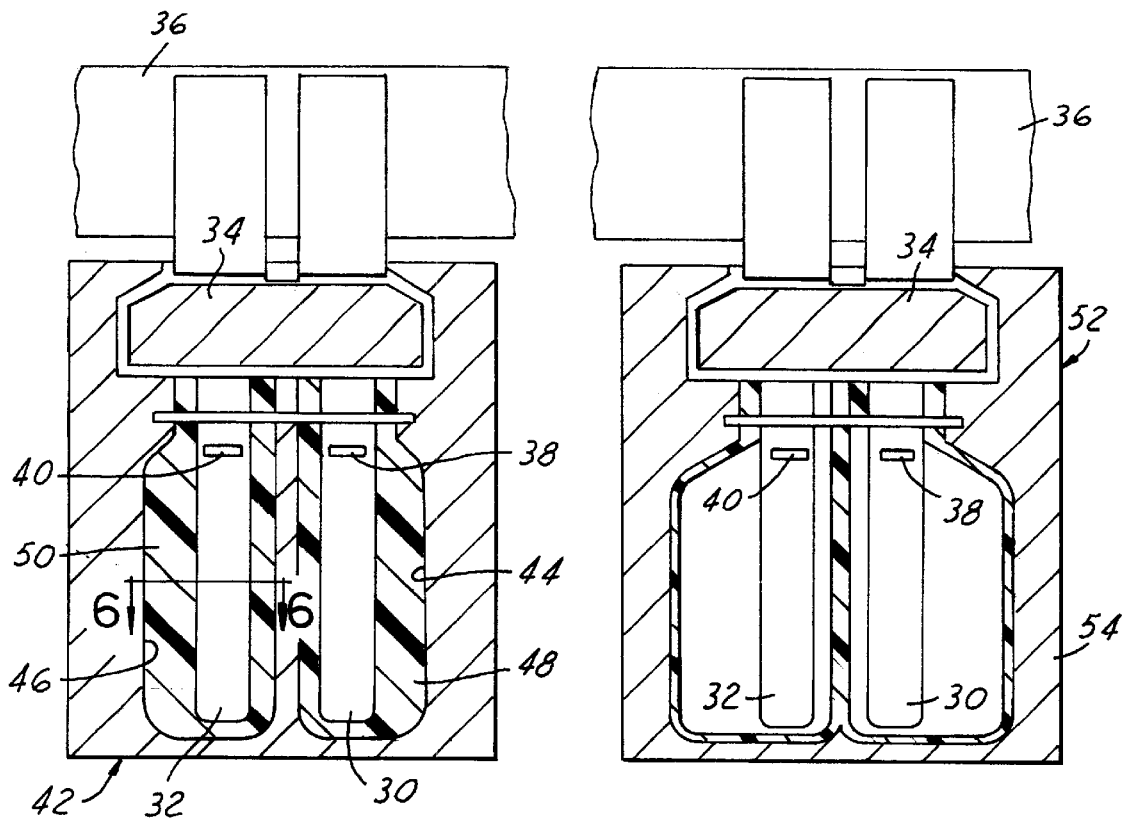
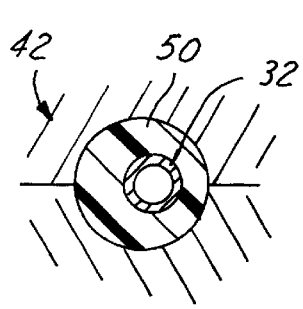
FIG.6
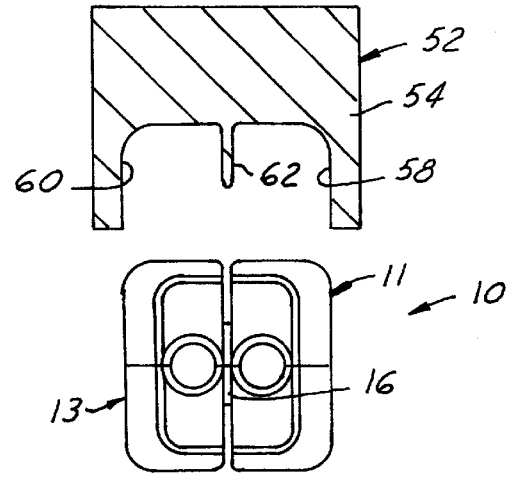
FIG.8
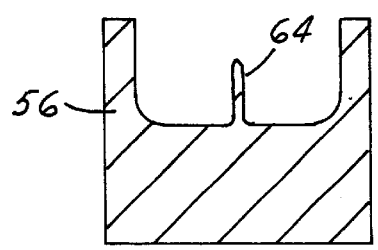

METHOD OF MANUFACTURING A DUAL-CHAMBER CONTAINER

The present invention is directed to a dual chamber container of integrally molded plastic construction, and more particularly to a method and apparatus for injection blow molding such a container.

BACKGROUND AND SUMMARY OF THE INVENTION

It has heretofore been proposed to provide a one-piece dual-chamber container by molding, such as by extrusion blow molding, separate container sections and then securing the sections to each other to form a unitary container. U.S. Pat. No, 5,823,391 is exemplary of this technology. It has also been proposed to form an extrusion blow-molded dual-chamber container by extruding a single tube, placing the tube in a blow mold with dividing wall portions that pinch the tube diametrically, and then blow molding the tube halves to the interior confines of the respective mold cavities. U.S. Pat. No. 5,882,574 illustrates technology of this character.

It has also been proposed to form hollow plastic containers by an injection blow molding (IBM) process. In such a process, a preform is injected into a first mold cavity around a core rod, and the core rod and preform are then moved to a second mold cavity. The preform is blown to the interior confines of the second mold cavity by air injected through the core rod, and the container is then removed from the core rod and the second mold cavity. U.S. Pat. No. 3,707,591 illustrates a turret-type machine for automated manufacture of hollow plastic containers in an injection blow molding operation.

Among the objects of the present invention are to provide a method and apparatus for injection blow molding a dual-chamber container as an integral unit so as to eliminate any requirement for attachment of separate container sections by gluing, welding, base cups or a dual closure in a post-molding operation, that have the potential for providing a two-color container, that exhibit enhanced neck finish dimensional stability, and/or in which the containers are finished upon ejection from the blow mold, which is to say that the containers do not require post-mold trimming of moils, tails or other process scrap. Another object of the present invention is to provide a dual-chamber IBM container made by such a process and/or such an apparatus.

A method of forming a dual-chamber container in accordance with a presently preferred embodiment of the invention includes providing a blow mold having a pair of adjoining cavities that are open to each other. A pair of mold preforms are constructed having non-uniform wall thicknesses, preferably by injection molding the preforms around associated core rods. The preforms are then non-centrally positioned in respective mold cavities such that a portion of each preform of greater wall thickness is spaced a greater distance from the opposing wall of the associated cavity than the portion of each preform of lesser wall thickness. The preforms are then blow molded simultaneously against the cavity walls and against each other so that the preforms are contact-welded to each other to form an integrally molded dual-chamber container of substantially uniform wall thickness. In the preferred embodiment of the invention, mold wall portions partially divide the blow-mold cavities from each other, and the preforms are placed in the blow-mold cavities such that the preforms are closer to the portions of the cavities that open to each other than to opposite walls of the cavities.

An apparatus for injection blow molding a dual-chamber container in accordance with a presently preferred embodiment of the invention comprises a pair of core rods carried on a transfer head. Means including the transfer head simultaneously position the core rods in first mold cavities for injection molding a preform around each core rod, with the injection mold cavities being constructed such that the preforms have non-uniform wall thickness around the core rods. Means including the transfer head then position the core rods and the preforms in a pair of second mold cavities that are open to each other along a common wall portion, with the preforms being non-centrally positioned in the second cavities such that a portion of each preform of greater wall thickness is spaced a greater distance from the opposing wall of the associated cavity than the portion of each preform of lesser wall thickness. The preforms are then blow molded within the second mold cavities such that adjacent portions of the preforms are contact welded to each other at the common wall portion of the cavities and the container has substantially uniform wall thickness.

A dual-chamber container in accordance with a third aspect of the present invention thus includes an integrally molded one-piece body having first and second blow molded chambers separated from each other by a common dividing wall contiguous with both of the chambers—i.e., forming a wall section of each chamber. The container also includes first and second injection molded finishes forming outlets for the respective chambers. The chambers each have a width parallel to the common wall, and the common wall occupies less than the entire width of the chambers. The chambers have separate walls contiguous with the common wall for the remainder of the width of each chamber. The dual-chamber container has substantially uniform wall thickness, and is formed by simultaneously blow molding a pair of preforms having non-uniform wall thicknesses while the preforms are non-centrally positioned in a pair of mold cavities. A portion of each preform of greater wall thickness is spaced a greater distance from the wall of the associated cavity than is a portion of each preform of lesser wall thickness. The preforms are blown against each other and contact welded along the common wall that divides the chambers.

BRIEF DESCRIPTION OF THE DRAWINGS

The invention, together with additional objects, features and advantages thereof, will be best understood from the following description, the appended claims and the accompanying drawings in which:

FIG. 5 is a schematic diagram of preforms being injection molded around core rods in an apparatus for injection blow molding the container of FIGS. 1–4 in accordance with the invention;

FIG. 6 is a fragmentary sectional view taken substantially along the line 6—6 in FIG. 5;

FIG. 7 is a schematic diagram of the dual-chamber container of FIGS. 1–4 being blow molded in accordance with the invention; and FIG. 8 is a schematic plan view of the blow mold in FIG. 7 being opened to eject the completed container.

DETAILED DESCRIPTION OF PREFERRED EMBODIMENTS

The disclosure of above-noted U.S. Pat. No. 3,707,591 is incorporated herein by reference.

Figure 3:
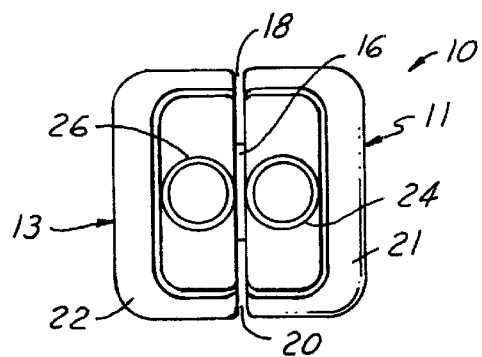
FIG. 3 is a top plan view of the container illustrated in FIGS. 1 and 2.
Figure 1:
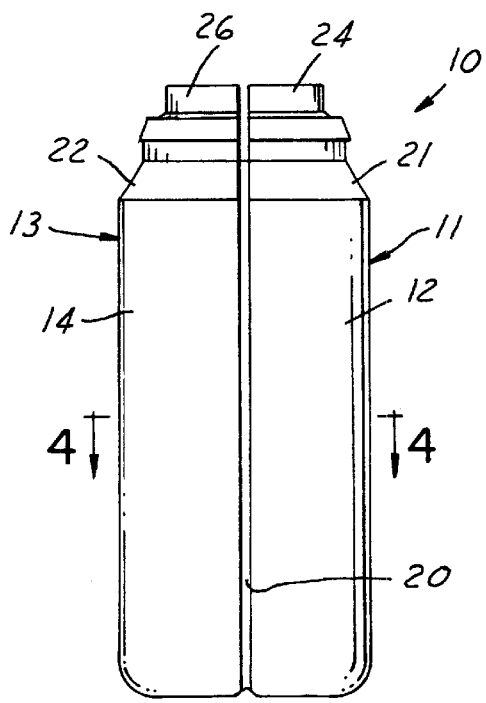
FIG. 1 is a front elevational view of a dual-chamber container formed in accordance with a presently preferred embodiment of the invention.
Figure 2:
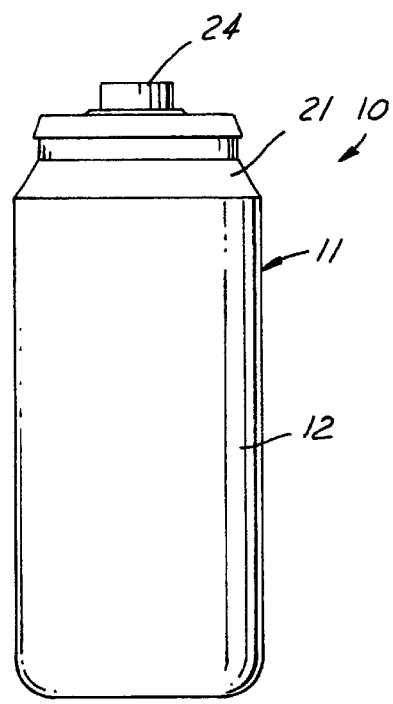
FIG. 2 is a side elevational view of the container illustrated in FIG. 1.

FIGS. 1–4 illustrate a dual-chamber container 10 in accordance with a presently preferred embodiment of the invention as comprising a pair of chambers 11, 13 having associated chamber sidewalls 12, 14. Chambers 11, 13 are contact welded to each other along a common central wall 16 to form a container 10 of homogeneously integral construction—i.e., a container integrally molded as a single unit. Common dividing wall 16 extends between a pair of laterally aligned indents 18, 20, which extend axially throughout the length of the container. Container chambers 11, 13 have respective shoulders 21, 22 that extend upwardly and inwardly from sidewalls 12, 14 and terminate in associated independent container finishes 24, 26. Each finish 24, 26 opens to the interior of the associated chamber for fitting and dispensing the contents of the container. Wall 16 extends from the base of chambers 11, 13 through at least shoulder portions 21, 22, as best seen in FIG. 1. After filling the two chambers of the dual-chamber container, a closure is affixed to each finish 24, 26, or the finishes may be interconnected by a dual-outlet closure.

FIGS. 5–8 illustrate a method and apparatus for constructing container 10 (FIGS. 1–4). Referring first to FIG. 5, a pair of core rods 30, 32 are carried by a transfer head 34, which in turn is carried by a suitable transfer mechanism 36 such as a rotatable turret illustrated in above-referenced U.S. Pat. No. 3,707,591. Core rods 30, 32 are hollow, and have one or more associated openings 38, 40. Core rods 30, 32 are first placed in associated cavities 44, 46 of an injection mold 42. Preforms 48, 50 are then injection molded around associated core rods 30, 32 within cavities 44, 46. It will be noted in FIGS. 5 and 6 that preforms 48, 50, which preferably (although not necessarily) are mirror images of each other, have a non-uniform radial wall thickness around the peripheries of associated core rods 30, 32. That is, cavities 44, 46 of injection mold 42 are configured such that the wall thicknesses of preforms 48, 50 are non-uniform around the circumference of core rods 30, 32. As illustrated in FIG. 6, the wall thickness of preform 50 is thinnest at the portion closest to core rod 30 and preform 48 (FIG. 5) and thickest on the diametrically opposite side furthest from core rod 30 and preform 48. The wall thickness of preform 50 varies uniformly circumferentially between these extremes. As noted above, preforms 48, 50 preferably are mirror images of each other. In the preferred embodiment, the materials injected into cavities 44, 46 are identical. However, the materials may be differently colored, or may be of different composition as long as they are compatible with each other. Container finishes 24, 26 are fully formed at the completion of this injection molding stage.

Figure 4:
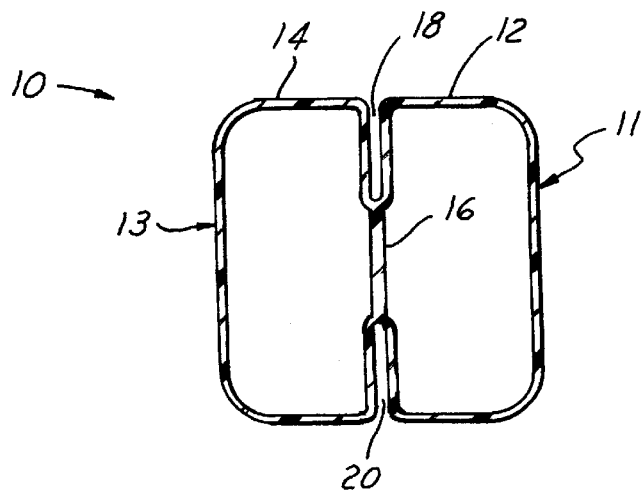
FIG. 4 is a sectional view taken substantially along the line 4—4 in FIG. 1.

Core rods 30, 32 and associated preforms are then transferred by transfer head 34 and transfer mechanism 36 to a blow mold 52 (FIGS. 7 and 8). Blow mold 52 comprises a pair of blow mold halves 54, 56 having internal wall surfaces that together define the outer periphery of the final container 10 (FIGS. 1–4). Thus, blowmold halves 54, 56 together define a first mold cavity 58 for molding container chamber 11, and a second mold cavity 60 for molding container chamber 13. Cavities 58, 60 open to each other, and there are a pair of wall portions 62, 64 on mold halves 54, 56 that partially separate cavities 58, 60 from each other. With the control rods and preforms non-centrally positioned within blow mold cavities 58, 60 and the mold halves closed, air is injected into the preforms through core rod openings 38, 40. The laterally outer portions of the preforms are expanded against the confines of respective blow mold cavities 58, 60, while the adjacent laterally inner portions of the preforms are brought into contact with each 25 other and contact welded to each other between mold cavity wall portions 62, 64. Mold cavity wall portions 62, 64 provide directional control over the contact welding operation and help ensure that wall 16 (FIGS. 3, 4 and 8) is of uniform planar construction—i.e., not buckled or distorted. It will be noted in FIG. 7 that core rods 30, 32 and associated preforms are non-centrally positioned within mold cavities 58, 60, so that the laterally outer portions of the respective preforms must travel a greater distance to the confines of the mold cavities than do the laterally inner opposed portions of the preforms that are ultimately contact welded to each other. Provision of preforms having non-uniform wall thicknesses, as illustrated in FIGS. 5 and 6, accommodates thinning of the wall sections as the wall sections are stretched to the confines of the mold cavity, so that the resulting container is of substantially uniform wall thickness throughout, as illustrated in FIG. 4.

There have thus been disclosed a dual-chamber container, and a method and apparatus for forming a dual-chamber container, that fully satisfy all of the objects and aims previously set forth. The container chambers are integrally formed in a single molding operation, and thus do not require attachment in post-molding gluing, welding or other mechanical joining operations. Although the two container chambers are of identical construction in the preferred embodiment, this need not necessarily be the case. Container finishes 24, 26 are fully formed in the injection molding operation (FIG. 5), and thus have enhanced dimensional stability and control. Furthermore, the dual-chamber container is completed at the end of the blow molding operation, and does not require trimming or other scrap-generating operations. A number of modifications and variations have been disclosed. Other modifications and variations will readily suggest themselves to persons of ordinary skill in the art. The invention is intended to embrace all such modifications and variations as fall within the spirit and broad scope of the appended claims.

What is claimed is:

1. A method of forming a dual-chamber container that comprises the steps of:

(a) providing a blow mold having a pair of adjoining mold cavities that are open to each other, (b) forming a pair of mold preforms having non-uniform wall thicknesses, (c) placing said preforms in respective mold cavities non-centrally positioned in said cavities such that a portion of greater wall thickness of each said preform is spaced a greater distance from the wall of the associated cavity than a portion of lesser wall thickness of each said preform, and (d) blow molding said preforms simultaneously against cavities and against each other to form an integrally molded dual-chamber container of substantially uniform wall thickness.

2. The method set forth in claim 1 wherein said step (b) comprises injection molding said preforms.

3. The method set forth in claim 2 wherein said step (c) comprises placing said preforms in said mold cavities such that said preforms are closer to the portions of said cavities that open to each other than to opposite walls of said cavities.

4. The method set forth in claim 3 wherein said step (a) includes providing mold wall portions that partially divide said cavities from each other, with said preforms being contact welded to each other between said wall portions during said step (d).

* * * * *